(12) United States Patent
Frieder et al.

(10) Patent No.: US 7,533,245 B2
(45) Date of Patent: May 12, 2009

(54) HARDWARE ASSISTED PRUNED INVERTED INDEX COMPONENT

(75) Inventors: Ophir Frieder, Chicago, IL (US); Salih Kagan Agun, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 601 days.

(21) Appl. No.: 10/470,613

(22) Filed: Aug. 1, 2003

(65) Prior Publication Data

US 2005/0114375 A1 May 26, 2005

(51) Int. Cl.
*G06F 15/76* (2006.01)
*G06F 17/00* (2006.01)

(52) U.S. Cl. ......................................... 712/32; 707/100
(58) Field of Classification Search ...................... 707/6; 712/32
See application file for complete search history.

(56) References Cited

U.S. PATENT DOCUMENTS

| | | | |
|---|---|---|---|
| 4,606,002 A | 8/1986 | Waisman et al. | |
| 4,611,272 A | 9/1986 | Lomet | |
| 4,811,199 A | 3/1989 | Kuechler et al. | |
| 5,257,365 A | 10/1993 | Powers et al. | |
| 5,418,942 A | 5/1995 | Krawchuk et al. | |
| 5,418,948 A | 5/1995 | Turtle | |
| 5,924,068 A | 7/1999 | Richard et al. | |
| 6,131,082 A | 10/2000 | Hargrave, III et al. | |
| 6,134,553 A | 10/2000 | Jacobson et al. | |
| 6,349,308 B1 | 2/2002 | Whang et al. | |
| 6,480,843 B2 | 11/2002 | Li | |
| 6,510,428 B2 | 1/2003 | Tsuchida et al. | |

FOREIGN PATENT DOCUMENTS

| | | |
|---|---|---|
| JP | 04344000 | 12/1992 |
| JP | 05217610 | 9/1993 |

OTHER PUBLICATIONS

Harman et al., Journal of the American Society for Information Science, vol. 41(8), pp. 581-589, 1990.*
Lipovski et al., Memory Technology, Design and Testing, 1999. Records of the 1999 IEEE International Workshop on Aug. 9-10, 1999 pp. 24-31.*
Mano, M., Computer System Architecture, 3rd Edition, Prentic-Hall, Inc., pp. 129-131 and 427-429, 1993.*
Schmidt et al., Ninth Euromicro Workshop on Parallel and Distributed Processing (PDP '01), 2001, pp. 443-450.*

(Continued)

*Primary Examiner*—Cheyne D Ly
(74) *Attorney, Agent, or Firm*—Pauley Petersen & Erickson

(57) ABSTRACT

An optimized document-indexing device is based on a pruned inverted index structure mapped to hardware. The device can be accommodated on a single chip and can be reprogrammed to accommodate index structures of different lengths and support varied posting-list sizes and varied term list sizes, thus sustaining high reusability and efficiency for a single device. The device can be used either as an internal slave component or as an external co-processor. The device controllers are efficient in resource demands and take only a minimal percentage of the logic and memory space of the hardware device.

20 Claims, 8 Drawing Sheets

OTHER PUBLICATIONS

Putz, S., Using a Relational Database for an Inverted Text Index, Xero Palo Alto Research Center, 1991, pp. 1-14.*

Wittig et al., IEEE Symposium on FPGAs for Custom Computing Machines, 1996, pp. 126-135.*

Li et al., IEEE Symposium on FPGAs for Custom Computing Machines, pp. 1-15, 2000.*

Gunther et al., IEEE Symposium on FPGAs for Custom Computing Machines, pp. 10-17, 1996.*

D. Carmel et al., "Static Index Pruning for Information Retrieval Systems", *Proceedings of the 24th Annual ACM SIGIR Conference on Research and Development in Information Retrieval*, ACM Press, New York, N.Y., Sep. 2001, pp. 43-50.

* cited by examiner

HARDWARE ASSISTED PRUNED INVERTED INDEX COMPONENT

BACKGROUND OF THE INVENTION

1. Field of the Invention

The present invention relates generally to Information Storage and Retrieval systems, and more particularly to means and methods for Content Analysis and Indexing especially as related to such systems and their algorithms implemented in hardware.

2. Discussion of the Related Art

There is a large demand for text retrieval as a critical component of information retrieval technology. Electronic text collections and the availability of searching such collections over the world wide web for example, has led to ever increasing demands for fast and accurate document indexing techniques. Several data structures have been used for Content Analysis and Indexing within the field of Information Storage and Retrieval systems. Two such structures are the inverted index file structure and the signature file structure. The commonly used inverted index file structure is fast, but may suffer from excessive storage and index maintenance overheads. Signature files require small storage overhead but require extra processing time and may result in false positive indications of the presence of the term within the document. In general, such text retrieval structures and techniques are software controlled and require relatively high processor overhead to run the information retrieval software routines.

Referring to FIG. 1, as noted above, one popular form of data indexing used to support the efficient searching of documents is the inverted index structure 21. An inverted index comprises a term list 23, e.g., the terms being words, phrases, stems, etc. Each term, e.g. term 25, has an associated posting list 27. A "posting list" 27 is a series of posting entries, collectively 29. A "posting entry" is data identifying at least a document 26 containing the term and an indication of the significance of the term in the given document, herein referred to as "weight". For example, weight may be, but is not limited to, the number of occurrences 28 of the term within the document. Other indicators of significance, i.e., weights, can rely on a composition function of the number of occurrences and term weighting such as inverted document frequencies or other such measures as known in the art. Without limitation and for simplicity of explanation, the remaining description only uses term occurrence. As used herein, a "posting" is a memory space for one posting entry. Thus, a posting list 27 will occupy a series of postings. In a typical inverted index structure, there may be an unlimited capacity for storing the posting entries corresponding to the documents associated with a term. As seen in the example of FIG. 1, the posting entries are not necessarily ordered in the posting list 27 by weight or by the document identifier. However, a sorted ordering according to any designated value or set of values within the posting entries is possible.

Referring to FIG. 2, a "pruned" inverted index data structure 31, e.g., a known technique such as set forth in the paper A. Soffer, et al., "Static Index Pruning for Information Retrieval Systems," *Proceedings of the 24th Annual ACM SIGIR Conference on Research and Development in Information Retrieval*, ACM Press, New York, N.Y., September 2001, pp. 43-50., limits the posting list 33 to a certain number of documents, e.g., space for a maximum of only 500 postings per term, as illustrated for the first term 35. Further, the posting list is sorted by weight, i.e., the frequency of term occurrence, 37 with the first posting 39 being occupied by the document reference with the greatest number of occurrences of the listed term. Pruned inverted indexes are known in the art as a highly efficient means of data structure for information retrieval. As is known in the art, only the top few retrieval listings in a document search are likely to be considered by the searcher to be highly relevant. Thus, a pruned inverted index structure, as shown in the previously cited Soffer, et al. article, often reduces the number of posting entries stored in the index while still providing comparable accuracy in query processing. For example, by storing only those posting entries of only those documents in which a given term appears frequently, the posting list size of the index is potentially dramatically reduced, thus improving runtime performance and reducing processor overhead.

In the past, certain hardware assisted Information Retrieval systems were suggested. These hardware assisted Information Retrieval systems relied on pattern matching operations utilizing VLSI oriented design architectures and often delivered a marginal cost/benefit ratio over the ever more efficient general processors running software algorithms to maintain the inverted index.

Pattern matching involves a logical character-by-character comparison of the entire (full text character) source string with the characters of the term comprising the search pattern. If a sub-string within the source string matches the desired term, a match is detected, and the term is considered present within the source string. The source string is often, but is not limited to, the entire document collection. In such a pattern approach, the pre-processing step of creating an index is generally avoided, reducing the storage overhead and preprocessing time. This reduction often comes at that expense of lengthier query processing times associated with the need to scan the entire document collection instead of merely accessing those documents that were predetermined to contain the term, as designated in the index.

Therefore, there is a need for a system of hardware assisted Information Retrieval using inverted index structures which supports a high cost/benefit ratio and can be plugged in, or added to, present information retrieval systems, and provides low storage and index maintenance overheads as compared to present systems.

SUMMARY OF THE INVENTION

The present invention provides for the above-stated need by a Hardware-Assisted Pruned Inverted-index component (hereinafter referred to sometimes as an "inverted index chip", for brevity). Because pruned inverted index structures are essentially regular in form with a fixed maximum number of postings for each term in the inverted index structure, the indexing mechanism can be laid out or mapped in regular form on hardware devices, e.g., on a Reconfigurable Computing (RC) chip, in an economical fashion. It will be noted that an RC chip is only one exemplary vehicle for mapping the inverted index structure onto the hardware layout of a chip. By implementing a pruned inverted-index in hardware, an inverted index chip system of the present invention can provide an internal slave component or an external co-processor that aids in high speed document searching by taking tasks away from the CPU and providing very fast/parallel searching and maintenance of the inverted index operations.

According to the present invention, a hardware implementation of the inverted index provides fast access to the posting list and fast updating of posting entries and term lists. Desirably, the term list and each posting list has a separate logic block for control of each list. Mapping the pruned inverted index structure approach to hardware thus vastly reduces information retrieval query processing times. In one aspect of the invention, an inverted index chip can be provided as a plug-in unit for personal computers to search resident document collections, which the person of ordinary skill in the art will recognize as analogous to the plugging-in of a digital signal processing (DSP) chip to expedite signal processing. Because the RC chip is reconfigurable, it can be applied to any of the existing or future text retrieval systems that are based on an inverted index storage structure. That is, the number of posting entries per term can be adjusted; hence collections needing a larger or smaller number of posting entries per term are accommodated. Further, as the inverted index chip of the present invention can support a varying number of terms, multiple chips operating as slaves unit can be used simultaneously, i.e., ganged, to accommodate collections that contain a larger number of unique terms.

Unlike prior hardware component support for document searching, the inverted index chip focuses on a chip that maintains a pruned inverted index rather than on filtering based on pattern matching. Mapping the highly accessed inverted index software structure onto a chip reduces the processing time associated with index access and simplifies maintenance of the index term and posting lists. Use of the inverted index chip hardware of the present invention to be especially assigned to the data indexing function thus enables faster indexing than is generally available by use of a general processor doing the same task through software operations.

By using RC's, such as Field Programmable Gate Arrays or any Complex Programmable Logic Device, with a structured inverted index system, the ability to map an appropriate programmable structure onto the array of gates will optimize performance of the Information Retrieval application at reasonable cost/benefit ratios. The RC's are readily available and relatively inexpensive to implement, as they will not incur nonrecurring engineering (NRE) costs associated with VLSI or ASIC chips. The inverted index chip system of the present invention can be reconfigurable for the number of terms in a term list, the size of the posting list, and can support parallel operations.

BRIEF DESCRIPTION OF THE DRAWINGS

These and other objects and features of this invention will be better understood from the following detailed description taken in conjunction with the drawings wherein.

DETAILED DESCRIPTION OF THE PREFERRED EMBODIMENT

Discussion of the device parts will be given herein with respect to specific functional tasks or task groupings that are in some cases arbitrarily assigned to the specific modules for explanatory purposes. It will be appreciated by the person of ordinary skill in the art that an inverted index chip according to the present invention may be arranged in a variety of ways, or that functional tasks may be grouped according to other nomenclature or architecture than is used herein without doing violence to the spirit of the present invention.

Figure 3:
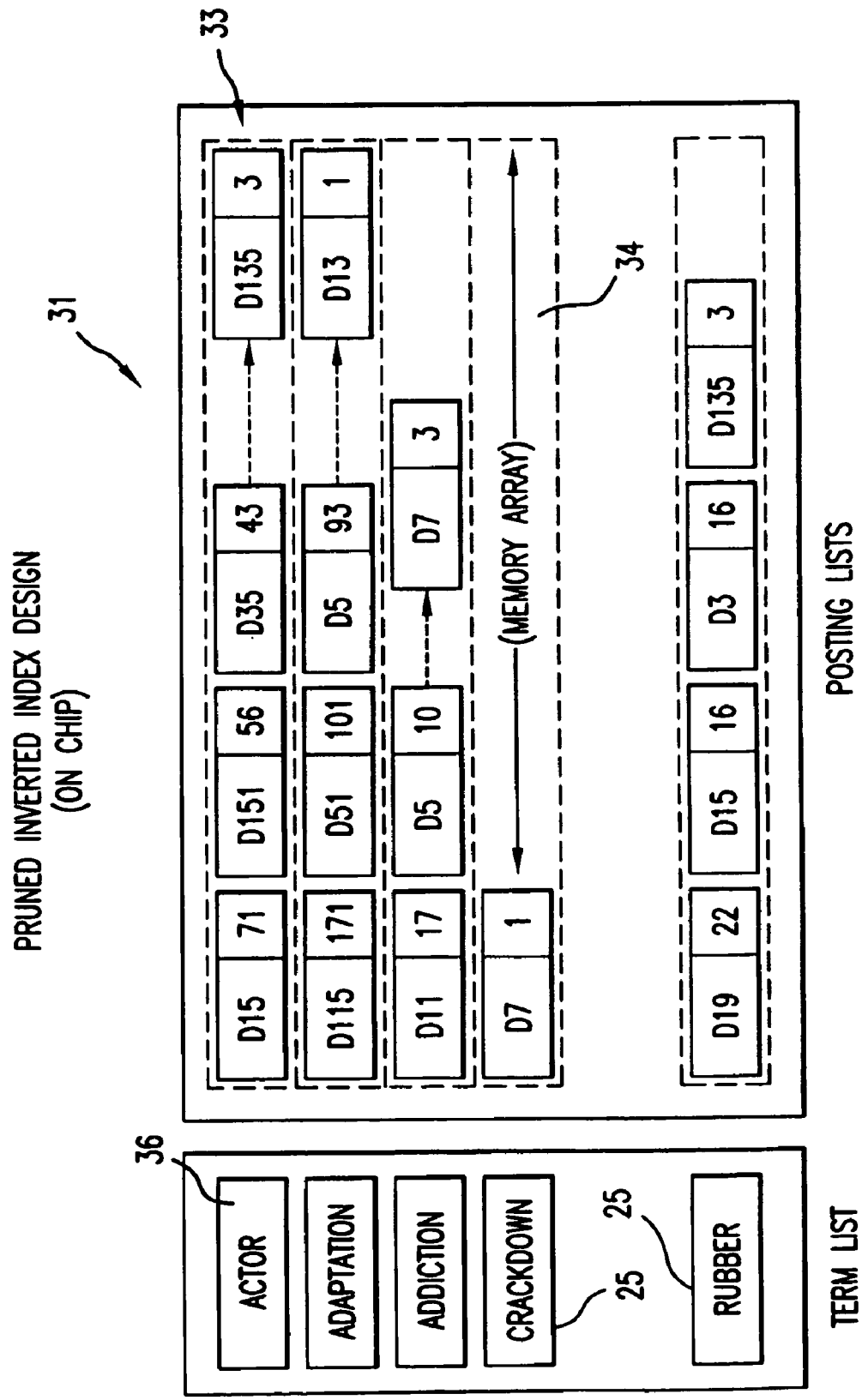
FIG. 3 is an illustration of a pruned inverted index structure mapped to hardware.

Referring to FIG. 3, there is shown a pruned inverted index 31 as mapped to hardware per the present invention. Particularly notable is the lack of need for pointers from posting entry to posting entry within a posting list 33 since the postings are physically concatenated in contiguous postings in a single memory array, e.g. 34, of fixed length. It will further be noted, in this illustration, that the term list 36 is physically ordered according to an alphabetical order of terms 25. It will be noted, however, that such ordering is not mandated, as direct access to terms independent of such ordering is likewise possible by a variety of means.

Figure 1:
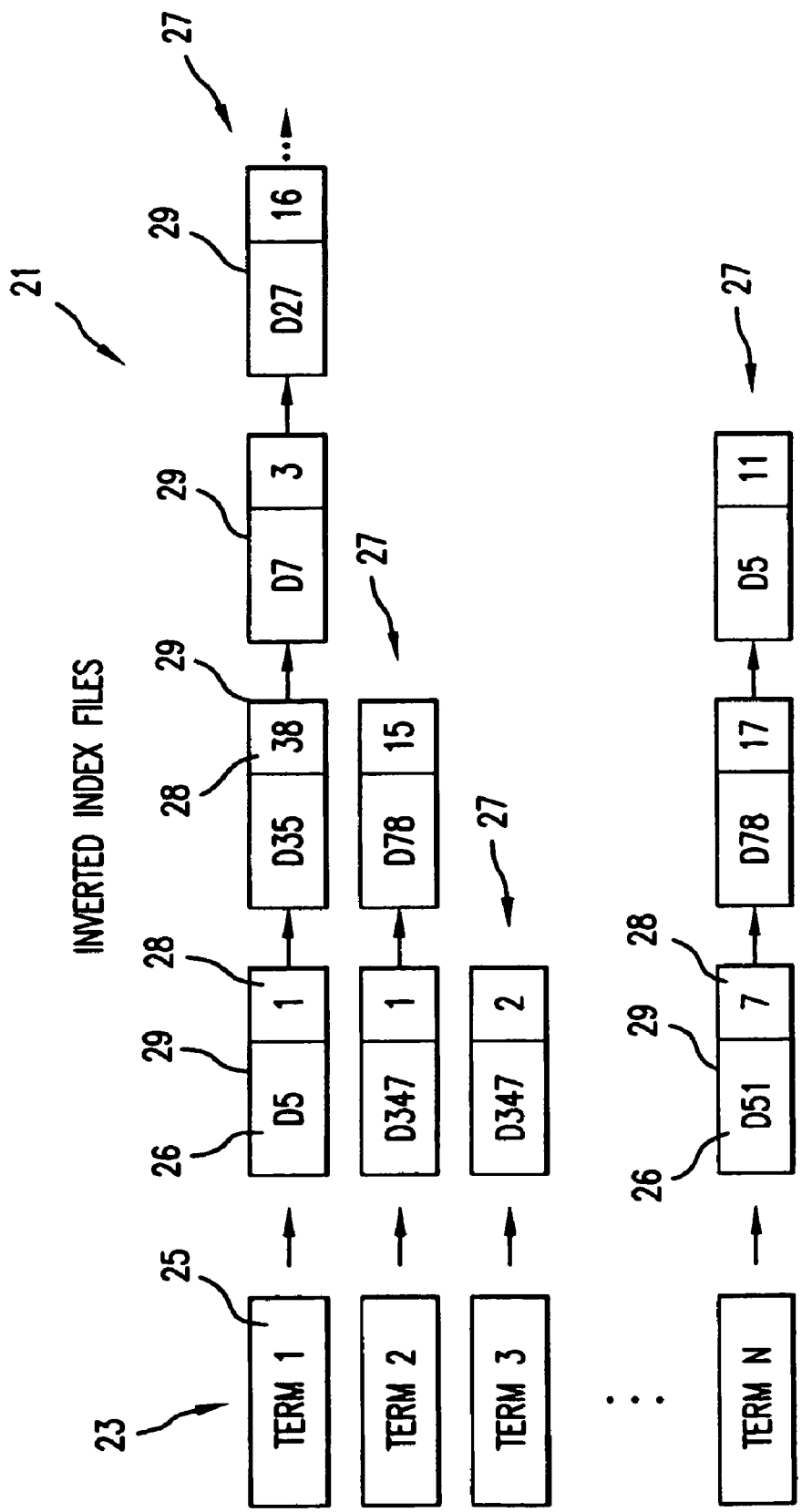
FIG. 1 is an illustration of a known inverted index structure.
Figure 2:
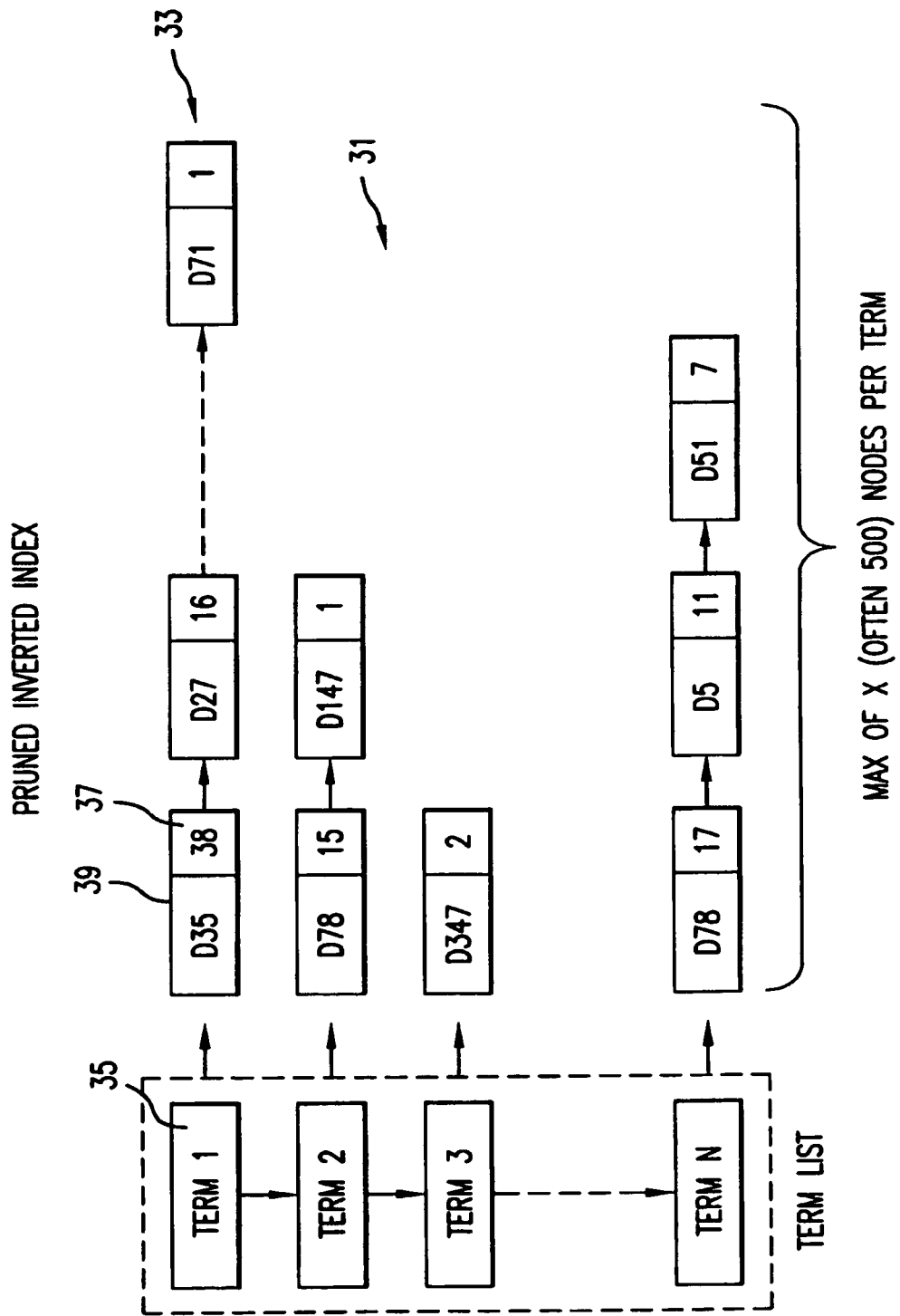
FIG. 2 is an illustration of a known pruned inverted index structure.
Figure 4:
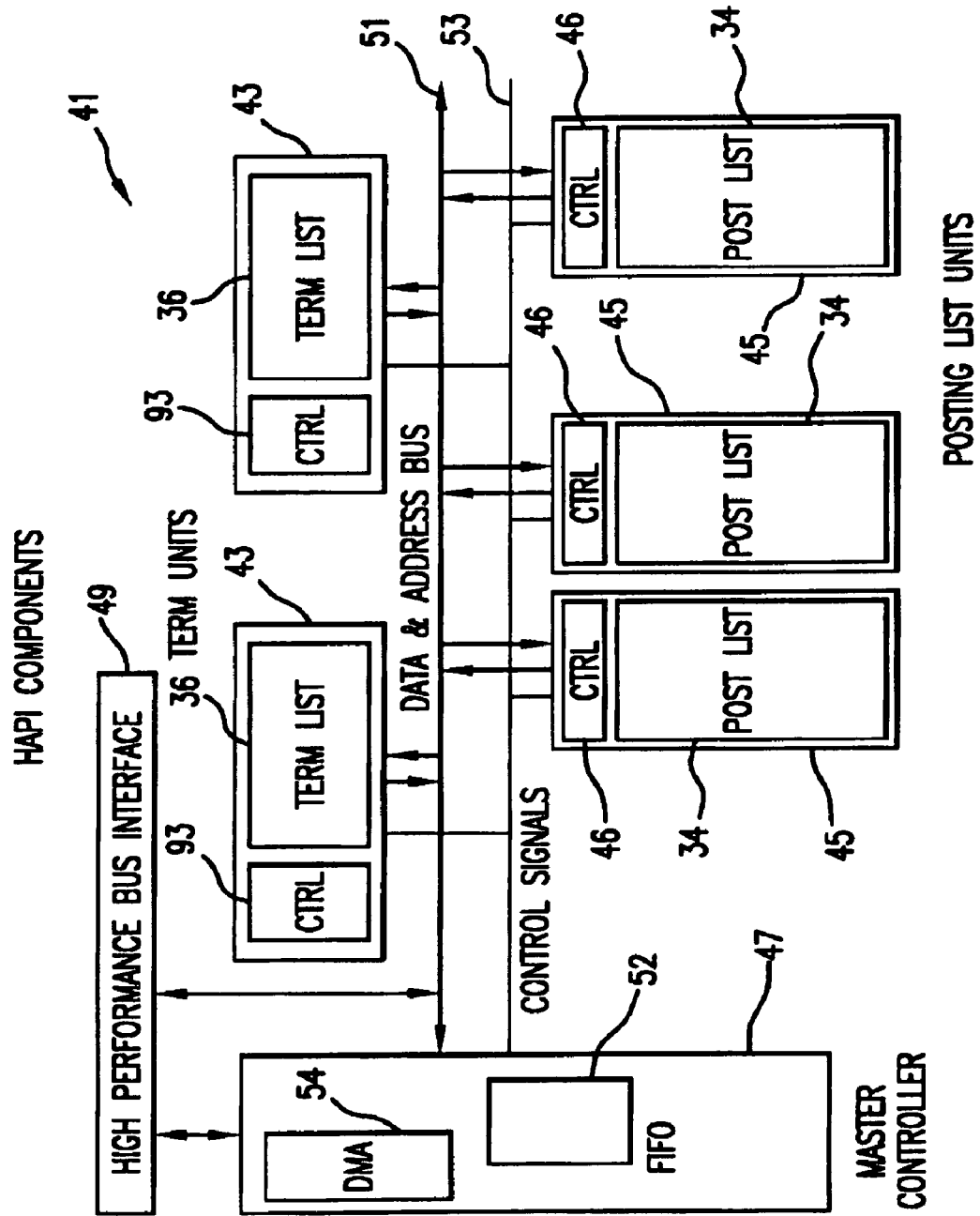
FIG. 4 is a schematic illustration of an inverted index chip system architecture.

Referring to FIG. 4, according to some aspects of the present invention, the architecture of the inverted index chip 41 desirably includes one or more term units, collectively 43, with individual controllers 93 and term lists 36; and an array of posting units, collectively 45, each with posting controllers 46, and the associated memory array 34 for maintaining the posting lists. A master controller 47 is included as the main processor for the inverted index chip 41. A high performance bus interface 49 is also included for interfacing the inverted index chip to external systems. Each term unit 43 will handle at least a portion of the total term list of the inverted index structure. Also referring to FIGS. 2 and 3, each posting list unit 45 controls and organizes at least a portion of one posting list 33 which stores the top X posting entries, where X is a predetermined integer, e.g., 500, in a sorted order by occurrence weight (e.g., highest number of term occurrences first to least number of term occurrences last). These posting list units 45 are connected via the internal data bus 51 and control signals bus 53 to both the master controller 47 and the term units 43. Direct memory access (DMA) to transfer data in and out of the chip is handled by the DMA unit 54, a part of the master controller 47. Requests are queued in the FIFO (first in-first out) unit 52, also a part of the master controller 47.

Figure 5:
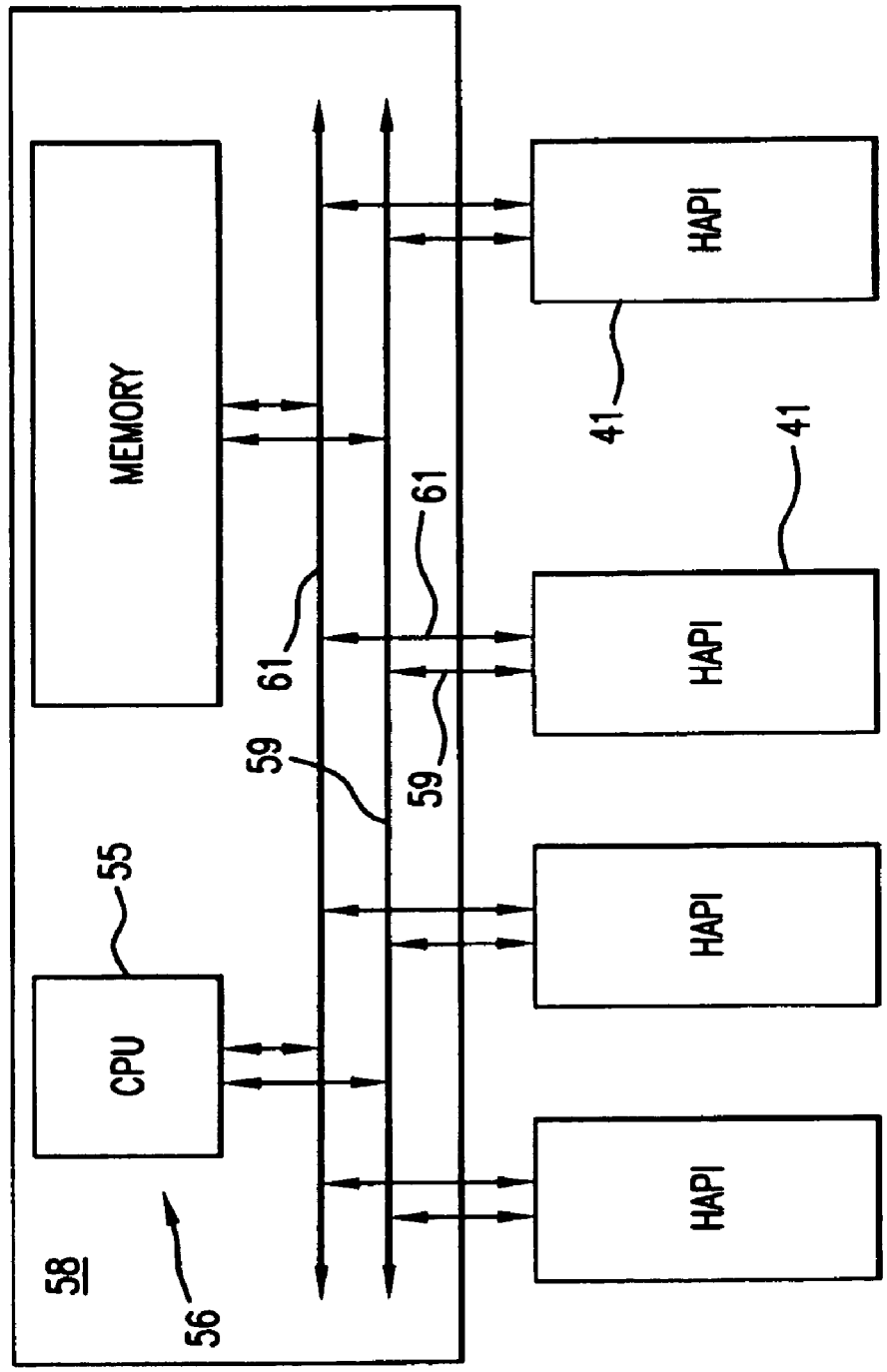
FIG. 5 is an illustration of the inverted index chips as interfaced in master/slave configuration to a central processor of an Information Retrieval system.

Referring again to FIG. 4, while a query operation is retrieving data from a first posting list unit 45, another posting list unit 45 can execute sorted-list update operations, for example, inserting a new posting entry. The master controller 47 distributes the list maintenance work and manages the communication with the main processor 55 (FIG. 5) of the Information Retrieval system 56 (such as may be resident in, e.g., a server or personal computer 58) through the high performance bus interface 49 as detailed in FIG. 6. The high performance bus interface 49 could be a PCI bus or any other bus commercially available. As shown in FIG. 5, each inverted index chip 41 may be operated as a ganged unit with other inverted index chips, or may operate independently, as selected by the system design.

Figure 6:
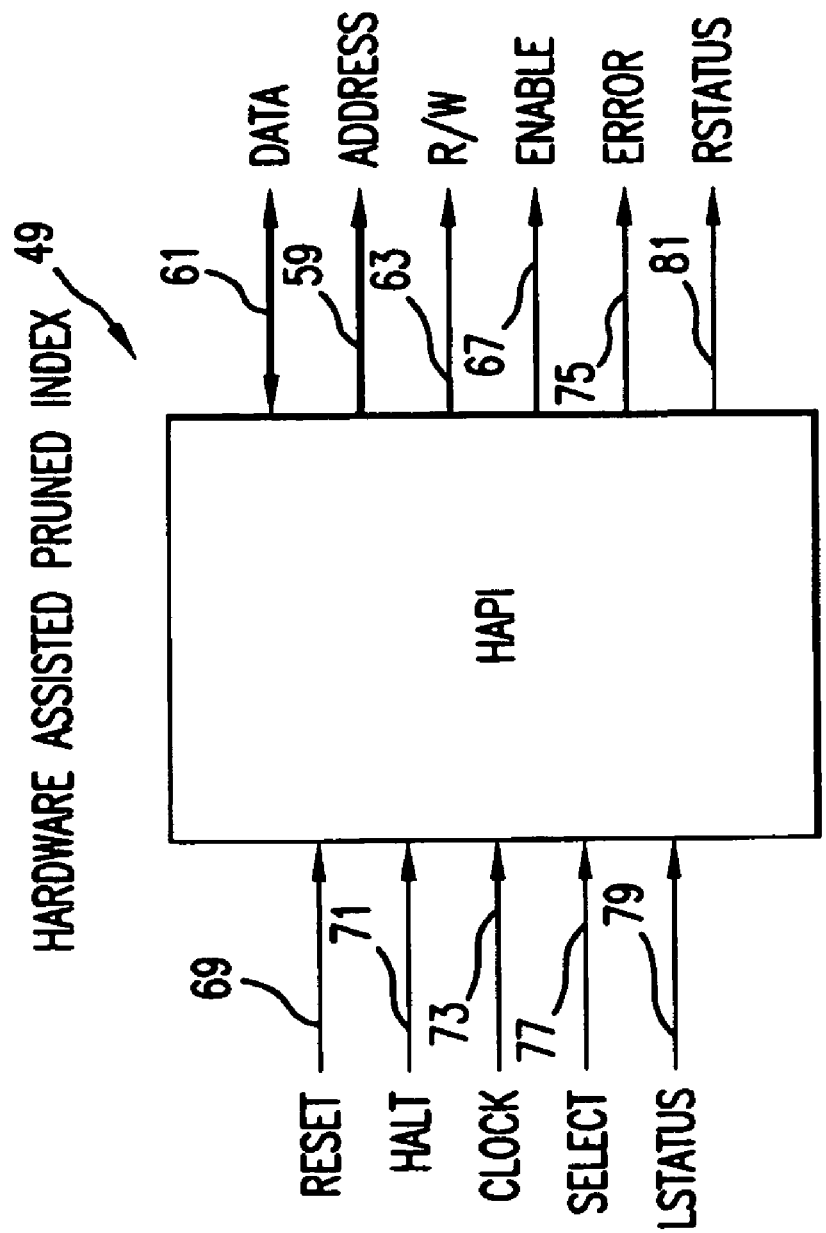
FIG. 6 is a schematic illustration of an inverted index chip external interface.

Referring to FIG. 6, the inverted index chip external interface is a high performance bus interface 49 including an address bus (Address) 59 and a bi-directional data bus (Data) 61, both of which can be implemented in any width. The lines RW 63 and Enable 67 are used to handle the memory access. The exemplary inverted index chip also includes asynchronous Reset 69 and Halt 71 signals, where Reset initializes the inverted index chip and Halt terminates the operation of the inverted index chip. The clock signal 73 is the system clock. The Error output 75 indicates an unrecoverable error state. The Select, Lstatus, and Rstatus signals 77, 79, and 81, respectively, may be used to simultaneously support up to sixteen of the inverted index chips 23 in some aspects of the invention.

Figure 7:
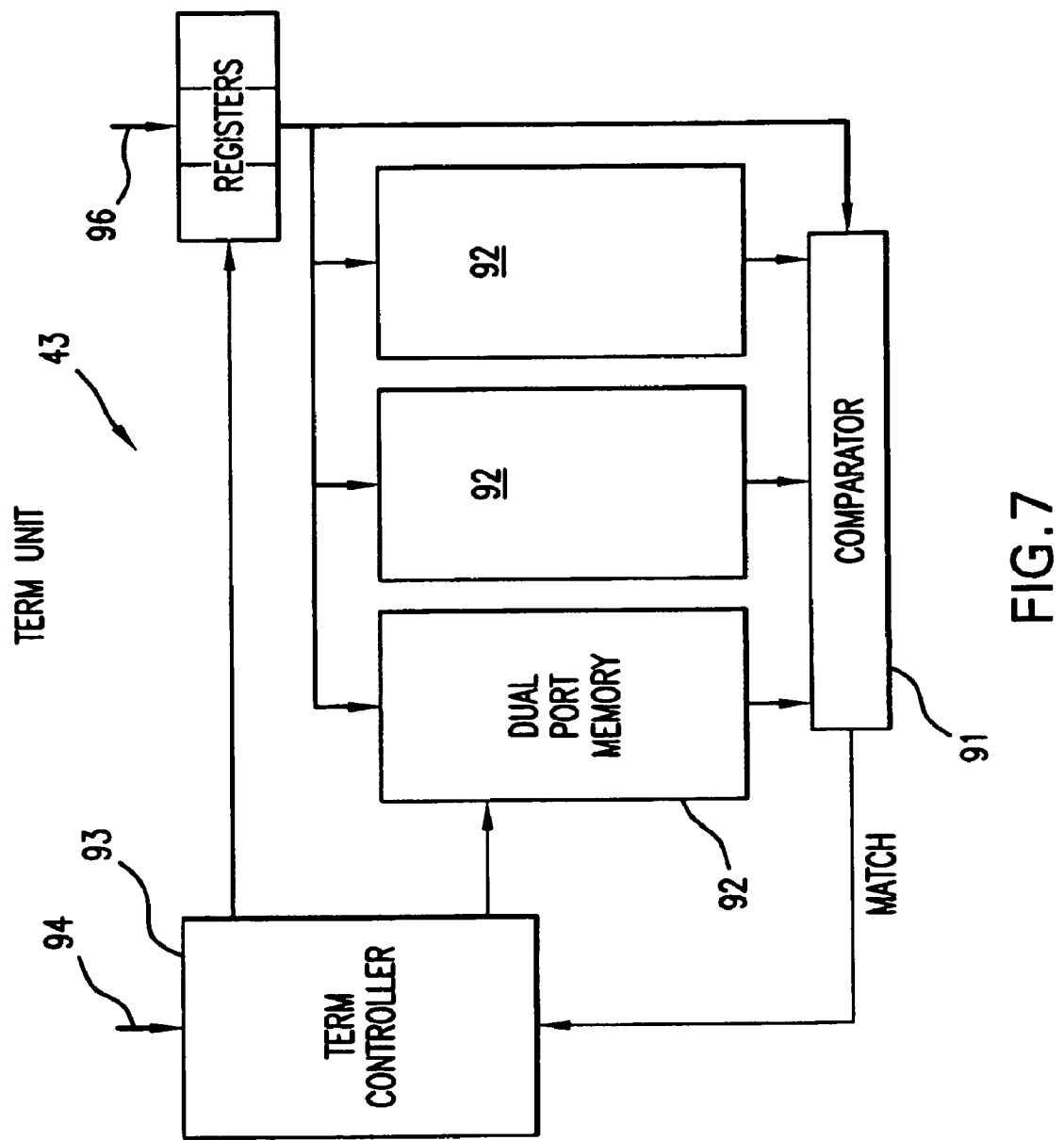
FIG. 7 is a schematic illustration of an inverted index chip system term-matching unit.

Referring to FIG. 7, a term unit 43, as used to compare the search pattern (term) against all terms presently stored in the term list 36, is shown in greater detail. A control bus 94 and a data bus 96 provide communications between the term matching comparator 91 and an associated term unit controller 93. Each one of N term units 43, can utilize its comparator 91 to simultaneously compare a portion of the search pattern stored in dual port memory locations, collectively 92, (whether a character, a term, or a set of terms) against the desired search pattern as given to the input register 96. If a term stored within the term memory 92 is matched with the desired search pattern in the register 96, the comparator 91 that detects the match notifies its associated term controller 93 for further processing.

Figure 8:
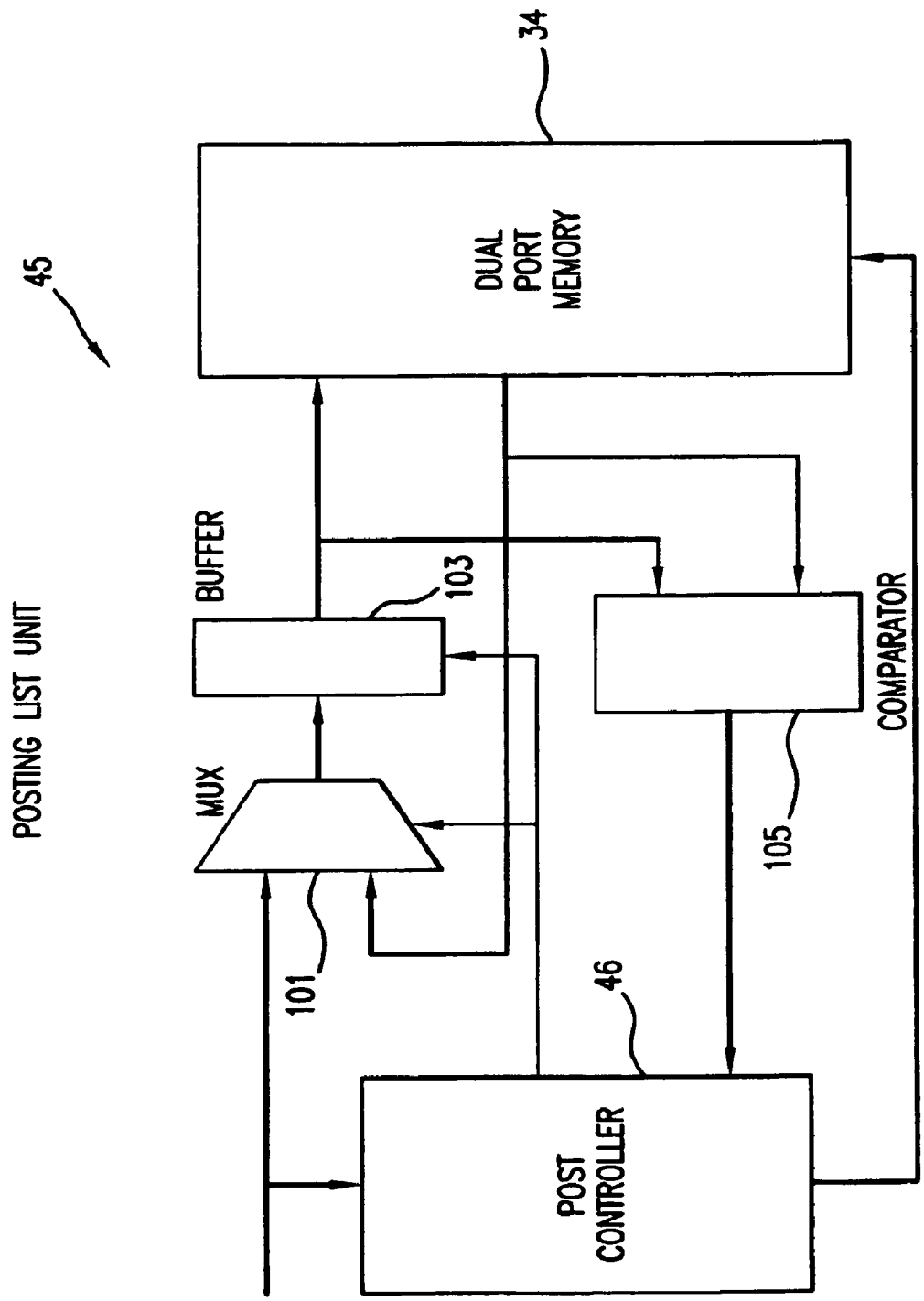
FIG. 8 is a schematic illustration of a posting list unit.

Referring to FIG. 8, a schematic illustration of a posting list unit 45, as used to maintain the order and the information of one posting list, is shown. A posting entry, such as a document name and its number of occurrences, is entered into a multiplexer (mux) 101. From the multiplexer 101 the posting entry is latched into a buffer 103 where it is compared at comparator 105 against the smallest, or least weighted, posting entry in the list contained within the dual port memory serving as memory space for the memory array 34 to determine if it should be in the posting list, and if so, the entry is then summoned by the posting list unit controller 46 to be compared against the other postings until it is ordered within the list.

EXAMPLES

LeonardoSpectrum™, from Mentor Graphics Corp. of Wilsonville, Oreg., a suite of high-level design tools for hardware synthesis, was used to design the exemplary inverted index chip. Table 1 below illustrates the logic cell usage and speed requirement of the inverted index chip components for an RC device, Cyclone EP1C20T400C, from Altera Corporation of San Jose, Calif. As can be seen, the control logic of the inverted index chip components requires only a small amount of cell resources. For example, the Term Unit 43 and Posting List Unit 45 controllers use one hundred twenty four and one hundred seventy eight logic cells, respectively. These controllers each use less than 1% of the total chip resources. The memory bits for storing the terms and posting entries use the majority of the chip resources.

TABLE 1

Resources claimed by Inverted Index Chip components.*

| Component | LogicCell (LC) | Memory (bits) | Frequency (MHz) |
|---|---|---|---|
| Generic DualPort Memory (256 × 32) | — | 8192 (3.13%) | 356.2 |
| TermFIFO + Gen Mem (256 × 32) | 124 (0.62%) | 8192 (3.13%) | 146.1 |
| TermUnit + TermFIFO (256 × 32) | 178 (0.89%) | 8192 (3.13%) | 90.6 |
| PostUnit + GenMem (256 × 32) | 93 (0.46%) | 8192 (3.13%) | 110.8 |
| Inverted Index Chip* (100 terms) | 8340 (41.58%) | 212992 (81.25%) | 79.7 |

*Cyclone EP1C20T400C (20,060 Logic Cells, 294,912 Memory bits)

Using a hardware implementation of the pruned inverted index algorithm reduces query-processing times. Because each term matching unit and each posting list unit can execute simultaneously, operations of the inverted index chip are fast. Using the internal inverted index chip memory as a cache also achieves high performance for the inverted index chip components since off-chip access is reduced. The inverted index chip was developed using a reconfigurable and reusable hardware architecture design approach and can be used in consumer commodity personal computers to support document search applications.

The present invention is described in terms of an exemplary embodiment of the inverted index structure and operations as mapped onto one chip. The person having ordinary skill in the art will appreciate that the techniques and systems described herein can be applied to a number of architectures and the present invention is not intended to be limited to the described exemplary embodiments. For example, the techniques described may be applied to a variety of inverted index structure arrangements, or a variety of chip types, or not limited to a single chip implementation. Thus, while certain exemplary embodiments have been put forth to illustrate the present invention, these embodiments are not to be taken as limiting to the spirit or scope of the present invention which is defined by the appended claims.

We claim:

1. A computer chip configured for maintaining an inverted index data structure having a term list and a posting list for each term in the term list, the computer chip comprising:
   at least one term unit for comparing query terms to the term list;
   at least one posting list unit connected to the at least one term unit by a data bus, each posting list unit maintaining an order and information of at least a portion of one posting list;
   a master controller for performing work control between the term unit and the plurality of posting list units and for communication with other computing devices, the master controller connected to the at least one term unit and the at least one posting list unit by a data bus;
   memory space for containing each term in a term list; and
   memory space for containing the posting list associated with each term of the term list;
   wherein each of the at least one term unit, the at least one posting list unit, the master controller, the memory space for containing each term in a term list, and the memory space for containing the posting list associated with each term of the term list are disposed on the computer chip.

2. The computer chip of claim 1 wherein the chip is configured to have a memory space of defined length for storing each posting list.

3. The computer chip of claim 1 wherein the inverted index data structure is a pruned inverted index data structure which stores the top N documents, where N is a predetermined integer, in a sorted order by weight.

4. The computer chip of claim 1 wherein each posting list unit includes a posting list unit controller for managing the information and order of a posting list.

5. The computer chip of claim 1 wherein each term unit includes a term unit controller for managing the information and order of a term list.

6. The computer chip of claim 1 further including an internal data bus and a control signal bus for communicating with the posting list unit controller and the term unit controller.

7. The computer chip of claim 1 further including a bus interface for external communications.

8. The computer chip of claim 1 wherein the chip can be operated in a master-slave operation with a CPU of an information retrieval system.

9. The computer chip of claim 1 wherein each term unit and each posting list unit can operate in parallel.

10. The computer chip of claim 1 wherein the master controller distributes the term list and posting list maintenance work and manages communications with an Information Retrieval system processor.

11. The computer chip of claim 1 wherein the chip includes internal memory configured for use as a cache for inverted index operations.

12. The computer chip of claim 1 wherein the chip is a reconfigurable computing chip.

13. A plug-in unit for personal computers to search resident document collections comprising the computer chip according to claim 1.

14. A plug-in unit comprising more than one of the computer chip according to claim 1 ganged together.

15. A slave unit to search resident document collections for a master central processing unit comprising the computer chip according to claim 1.

16. A personal computer having a computer chip according to claim 1.

17. An information retrieval system having a computer chip according to claim 1.

18. A computer chip configured for maintaining an inverted index data structure having a term list and a posting list for each term in the term list, the computer chip comprising thereon:

at least one term unit for comparing query terms to the term list, each term unit including a term unit controller and a memory space, the memory space containing a plurality of terms that form at least a portion of the term list;

at least one posting list unit maintaining the order and the information of at least a portion of the posting list, each posting list unit including a posting list unit controller and a memory space containing a plurality of posting entries, each of the plurality of posting entries associated with a term of the term list;

a master controller in work control communication between the at least one term unit and the at least one posting list unit and for communication with other computing devices; and a data bus connecting the at least one term unit, the at least one posting list unit, and the master controller.

19. The computer chip of claim 18 wherein the inverted index data structure is a pruned inverted index data structure.

20. The computer chip of claim 18, further comprising thereon:

a plurality of term units and a plurality of posting units; and at least one of an internal data bus and a control signal bus connecting the plurality of term units, the plurality of posting units, and the master controller.

\* \* \* \* \*